Oct. 20, 1942.  P. R. GJERTSEN  2,299,226
TOOL
Filed June 13, 1940
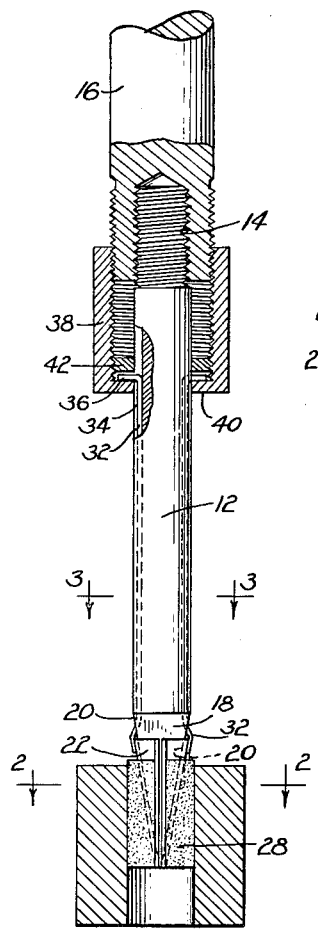
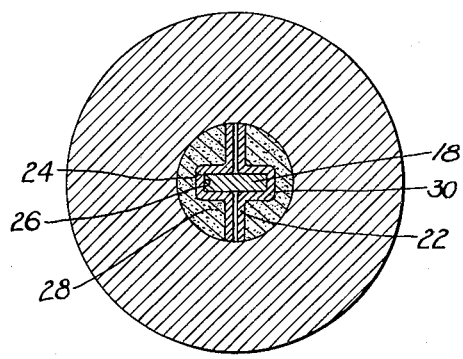
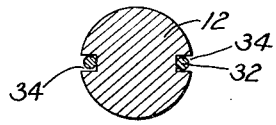
Inventor:
Paul R. Gjertsen Patented Oct. 20, 1942

2,299,226

UNITED STATES PATENT OFFICE 2,299,226

TOOL

Paul R. Gjertsen, Detroit, Mich., assignor to Ex-Cell-O Corporation, Detroit, Mich., a corporation of Michigan Application June 13, 1940, Serial No. 340,309

1 Claim. (Cl. 51—184.3)

The invention relates to a tool, and more particularly to a lapping or honing tool for use in finishing the inner surface of cylindrical members, and the subject matter of this invention is a continuation-in-part of my copending application Serial No. 188,593, filed February 4, 1938.

An object of the invention is to provide a new and improved tool having axially movable abrasive members associated with means operable as an incident to the axial movement of said members to move them radially to vary the outside diameter of the abrasive surface.

Another object of the invention is to provide a new and improved tool embodying a plurality of abrasive elements slidable longitudinally along tapered surfaces to effect a radial adjustment for varying the outside diameter of the working surface of the abrasive members.

Further objects of the invention are to provide a new and improved tool embodying, among other features, a novel form of abrading element and a novel form of supporting means for the abrading element, the element and the supporting means being arranged to be bonded together and the abrading unit thus formed being fashioned for operative association with coacting tapered surfaces.

Other objects and advantages of the invention will become apparent in the following description and from the accompanying drawing, in which:

Figure 1 is a side elevational view of a tool embodying the features of the invention, parts being broken away and in section.

Fig. 2 is a transverse sectional view through the tool on the line 2—2 of Fig. 1.

Fig. 3 is a transverse sectional view on the line 3—3 of Fig. 1.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claim.

Referring to the drawing, the tool in the exemplary form which has been selected for illustrative purposes, includes a shank, mandrel or arbor 12 having one end thereof arranged to be operatively connected with a rotatable driving spindle or the like. Thus, in the present instance, the end of the shank is screw threaded, as at 14, to engage a socket 16 constituting an element adapted to be inserted in a suitable chuck or the like.

The opposite end of the shank 12 has an end portion arranged to be operatively engaged by the abrading unit. Thus, as shown in Fig. 1, diametrically opposite end portions of the shank are cut away to provide a thin plate 18 presenting substantially flat opposed faces. The plate is located approximately on the diameter of the shank and opposite side edges thereof are tapered, as at 20, with respect to the axis of the shank, and the tapered edges substantially meet on the axis of the shank at the extreme end thereof.

Carrier members or holders 22 for the abrasive elements are arranged for operative engagement with one of the tapered side edges 20 of the plate 18. Each carrier is flat, is preferably formed of sheet metal, and has a longitudinal medial portion thereof bent to provide a rib 24 of U-shaped cross section projecting beyond one face of the holder. On the opposite face, the bent portion provides a groove 26 which is dimensioned snugly to embrace a tapered edge portion of the plate 18. The rib and the groove 26 are of gradually increasing height or depth, respectively, from one end of the holder to the other and the angularity of the base of the groove is complemental to that of the taper on a side edge of the plate 18.

The holder supports an abrasive element 28 which is substantially semi-cylindrical in cross section and has a medial longitudinal groove 30 therein of gradually increasing depth from one end to the other. The groove 30 is complemental to the shape of the rib on the holder to provide a snug fit between the holder and the abrasive element. These parts are bonded together in any suitable manner.

As may be seen in Fig. 1, the holder is somewhat longer than the abrasive element bonded thereto and in assembly the end of the holder, at which the dimension of the rib is the greatest, extends beyond the abrasive element. An elongated rod 32 is secured at one end to a projected part of the holder, for instance to the rib (as shown). Grooves 34 are formed diametrically on the shank to extend longitudinally thereof substantially on the plane of the plate 18. Each of these grooves receives the rod 32 on the holder associated with the corresponding tapered side edge of the plate. The rods preferably do not project beyond the outer periphery of the shank 12.

The free ends of the rods are bent at right angles, as indicated at 36, to provide short ends that, in assembly with the shank, extend outwardly and radially therefrom. A nut or collar 38 having external screw threaded engagement with the end of the socket has a radial flange 40. A disk 42, screw threaded into the nut or collar 38, is arranged to bind the ends 36 on the rods against the flange 40 on the nut. Adjustment of the nut 38 relative to the socket 16 will effect an axial movement which, through the rods 32, will move the abrasive units in an axial direction along the plate 18. This movement will, because of the interengaging complemental surfaces produce a radial movement of the abrasive unit to increase or decrease the outside diameter of the abrading surfaces thereon. It will be understood that in the present form two abrasive units, each preferably comprising an abrading element bonded to a holder, are operatively assembled on the tapered plate of the shank.

Cross reference is hereby made to my copending application Serial No. 264,706, filed March 29, 1939, and matured as Patent No. 2,268,479, December 20, 1941, which covers the subject matter of invention generic to the two cases.

I claim as my invention:

In a tool of the class described, in combination, a shank having at one end thereof an axially extending diametrical blade, said blade having its edges of uniform angularity with respect to the axis of said shank to provide tapering edges that meet substantially on the axis of said shank, a sheet metal holder medially and longitudinally bent to provide a U-shaped groove arranged snugly to fit upon a side edge of said blade and relatively wide side portions extending laterally outwardly from each side of said groove, said groove being of gradually diminishing depth from one end of said holder to the other to provide a groove having a base complemental to the angle of a side edge of said blade, an abrading element of substantially uniform semi-circular cross sectional area bonded to said holder and having a medial longitudinal recess to receive the bent portion of said holder and flat side faces to abut the wide side portions of said holder, and means connected to said holder for shifting said holder and abrading element along said shank.

PAUL R. GJERTSEN.